UNITED STATES PATENT OFFICE.

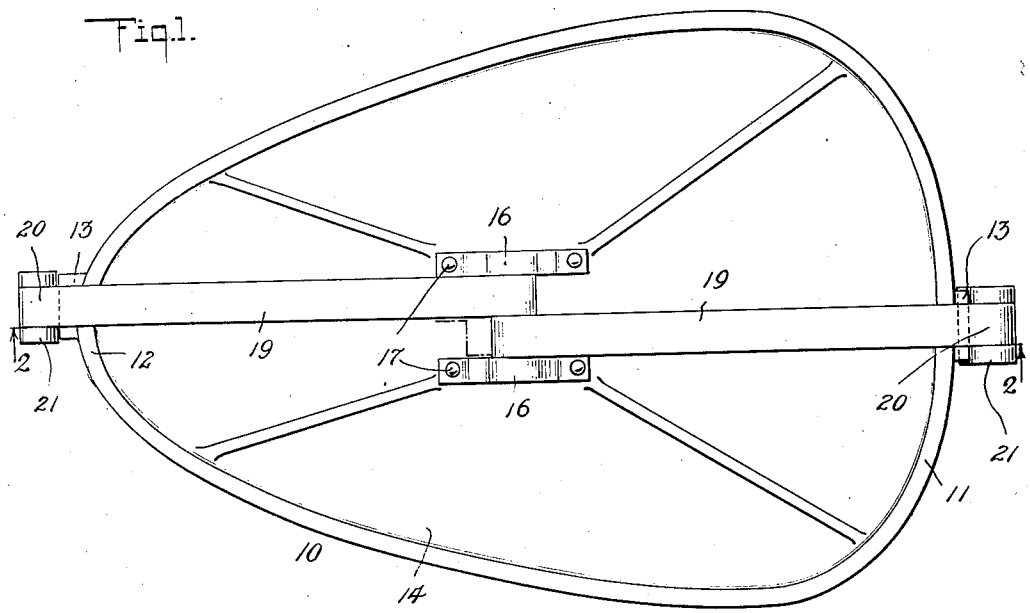
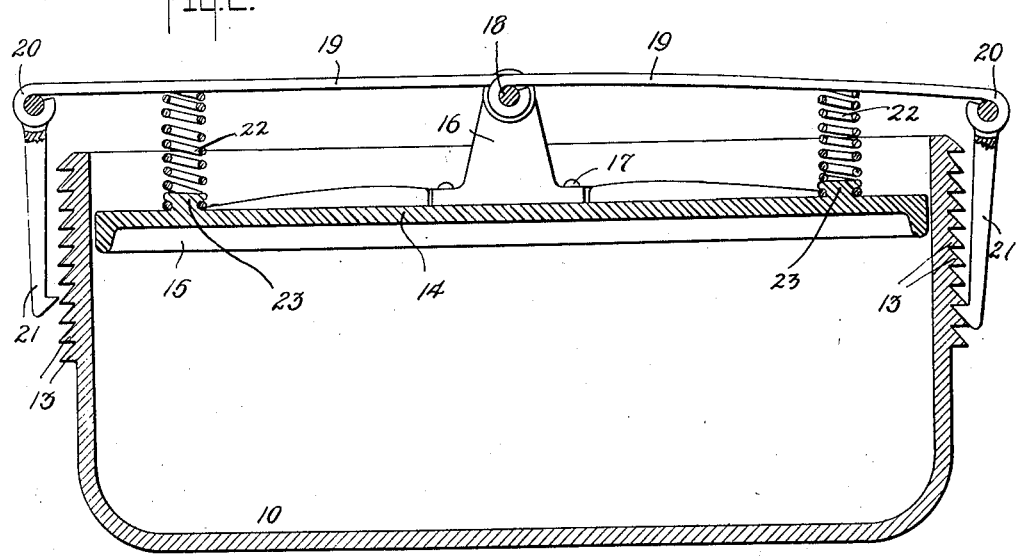

HANS ADELMANN, OF NEW YORK, N. Y., ASSIGNOR TO HAM BOILER CORP., OF NEW YORK, N. Y., A CORPORATION OF NEW YORK.

HAND-OPERATED HAM BOILER.

1,408,153.            Specification of Letters Patent.      Patented Feb. 28, 1922.

Application filed February 3, 1921. Serial No. 442,177.

*To all whom it may concern:*

Be it known that I, HANS ADELMANN, a citizen of Germany, residing at New York city, borough of the Bronx, in the county of Bronx and State of New York, have invented certain new and useful Improvements in Hand-Operated Ham Boilers, of which the following is a specification.

This invention relates to meat cooking appliances and has particular reference to devices for boiling hams or the like and simultaneously shaping them for the most advantageous slicing thereafter.

Among the objects of this present improvement is to provide a ham boiler, and by the term "ham", as used herein, I mean to be understood as covering any analogous food commodity to be cooked or molded therein, adapted especially for hand manipulation in the closing and locking of its cover, as distinguished from that type of devices better adapted for power compression.

A further object of the invention is to provide a locking device operative between the cover and the body of a ham boiler, that is most convenient for rapid hand manipulation and which is of a relatively simple and effective construction.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a plan view.

Fig. 2 is a vertical longitudinal section on the line 2—2 of Fig. 1.

Referring now more specifically to the drawings I show my device as comprising a body 10 of any suitable size, material, or design, but indicated as being oval in plan and with substantially vertical sides and flat bottom whereby a ham may be easily made to approximate the shape of the body, and which when finished will produce transverse slices that are substantially rectangular and hence most economical when served.

The body is shown formed at its opposite ends 11 and 12 with vertical series of rack teeth 13, the points of which are directed outward and downward. It will be noted from Fig. 1 that these two series of teeth are located mainly on opposite sides of the vertical longitudinal central plane of the body, but substantially directly opposite each other from the center of the body.

The cover 14 is shaped in plan to conform to the shape of the interior of the body, along which it is adapted to slide into and out of the body. It is shown as substantially flat to insure a flat side for the ham parallel to the bottom. It is also provided with a strengthening rim 15 projecting downward and serving the better to retain the ham in place while being shaped and cooked.

Extending upward from the central portion of the cover are two vertical spaced standards 16, connected rigidly to the top of the cover by any suitable means such as rivets 17. Hung upon a transverse pivot 18 secured in the upper ends of the standards 16 are two flat spring arms 19, extending thence over and beyond the ends of the cover and having at their outer ends knuckles 20 from which depend pivoted hooks 21 adapted to co-operate with the teeth 13. These arms 19 lie on opposite sides of the aforesaid vertical central plane of the boiler and so the respective hooks depending therefrom co-operate directly with the offset series of teeth.

Between the outer surface of the cover and any suitable portion of each arm intermediate of its ends is interposed a resilient pressure member shown in the form of a coil spring 22 whose lower end is engaged around a knob 23 formed integral with the cover, while the upper end of the spring bears against the under surface of the arm. The manner of connecting the spring to the cover insures that it will be maintained in proper vertical position, even though the arms may swing away from them when the cover is loose.

After the ham is made and introduced into the body the cover is introduced and forced downward under a suitable degree of pressure as may be exerted thereon by the operator grasping the knuckle ends of the arms and forcing downward thereon, such position being then maintained by the simple movement of the operator's fingers inward against the hooks to cause them to engage suitable selected teeth of the racks. The entire device may then be readily handled by taking hold of any part of the arms desired. The relative strengths or stiffness of the arms and pressure members may be variously determined, but it is desirable that both sets of these members shall be distorted or put under tension at the same time coincident with the setting and locking of the cover as above described, as will be appreciated in observing Fig. 2 in which one of the arms is free and the other is indicated in engaged position, the latter being shown curved to indicate a certain amount of tension applied thereto, so likewise the cushioning member 22 is indicated as being compressed somewhat with respect to the one that is at the other end of the cover.

I claim:

1. In a hand operated ham boiler, the combination with a body having substantially vertical sides and ends and having vertical series of rack teeth formed on the outer surfaces of the ends, of a cover movable into and out of the body, a transverse pivot above the central portion of the cover, a pair of flat metal arms mounted upon said pivot and extending thence beyond the ends of the cover and over the ends of the body, a pair of hooks depending from the ends of the arms and adapted to co-operate with selected teeth of the racks aforesaid, and pressure means between the cover and the arms.

2. A device as set forth in claim 1 in which the arms are so made as to be flexible.

3. A device as set forth in claim 1 in which the pressure means consists of a resilient cushion between each arm and the cover.

4. A device as set forth in claim 1 in which the arms are flexible and the pressure means consists of two coil springs arranged vertically between the mid-portions of the arms and the top of the cover.

5. A device as set forth in claim 1 in which the arms and the respective racks co-operating with the hooks thereof lie on opposite sides of the vertical longitudinal central plane of the body.

6. In a ham boiler, the combination with a body and a cover movable thereinto, of a transverse pivot above the central part of the body, locking means between the cover and the body comprising a pair of arms pivoted upon said pivot, a coil spring pressure member between the middle portion of each arm and the cover, and a knob formed integral with the cover upon which the lower end of the spring is gripped to hold the spring vertical.

In testimony whereof I affix my signature.

HANS ADELMANN.